(12) United States Patent
Kennedy

(10) Patent No.: US 9,068,313 B2
(45) Date of Patent: Jun. 30, 2015

(54) SYSTEMS AND METHODS FOR RECOVERING OIL FROM WATER

(75) Inventor: Kevin Kennedy, Anchorage, AK (US)

(73) Assignee: Pacific Petroleum Recovery Alaska, LLC, Anchorage, AK (US)

( * ) Notice: Subject to any disclaimer, the term of this patent is extended or adjusted under 35 U.S.C. 154(b) by 157 days.

(21) Appl. No.: 13/703,505

(22) PCT Filed: Jun. 9, 2011

(86) PCT No.: PCT/US2011/039718
§ 371 (c)(1),
(2), (4) Date: Dec. 11, 2012

(87) PCT Pub. No.: WO2011/156550
PCT Pub. Date: Dec. 15, 2011

(65) Prior Publication Data
US 2013/0082007 A1 Apr. 4, 2013

Related U.S. Application Data

(60) Provisional application No. 61/354,147, filed on Jun. 11, 2010.

(51) Int. Cl.
*E02B 15/04* (2006.01)
*E02B 15/06* (2006.01)
*E02B 15/08* (2006.01)

(52) U.S. Cl.
CPC .............. *E02B 15/048* (2013.01); *E02B 15/06* (2013.01); *E02B 15/0842* (2013.01)

(58) Field of Classification Search
CPC ... E02B 15/045; E02B 15/047; E02B 15/048; E02B 15/06; E02B 15/0842; E02B 15/10
USPC ................... 210/747.6, 776, 170.05, 170.09, 210/170.11, 242.1, 242.3, 923; 405/60, 63
See application file for complete search history.

(56) References Cited

U.S. PATENT DOCUMENTS 3,219,190 A 11/1965 Thune
3,523,611 A 8/1970 Fitzgerald
(Continued)

OTHER PUBLICATIONS

Magie et al. ("Pair-Trawl Detection of PIT-Tagged Juvenile Salmonids Migrating in the Columbia River Estuary, 2008," Report of research by Fish Ecology Division, Northwest Fisheries Science Center, National Marine Fisheries Service, National Oceanic and Atmospheric Administration, May 2009).

(Continued)

*Primary Examiner* — Christopher Upton
(74) *Attorney, Agent, or Firm* — James A. Bradburne

(57) ABSTRACT

This invention relates generally to products and processes, and more specifically, to systems and method for recovering oil from water. In one embodiment, a towed net system is provided which has the ability to collect free floating oil to one or more end points from which either/both hydrodynamics and/or one or more powered pumps are used to deliver channeled and collected oil to one or more receiving vessels. In some embodiments, two wing nets are provided, either/each towed by one or more vessels, connected to one or more end receptacle nets. From the one or more end receptacles, the channeled and collected oil is delivered to one or more receiving containers also connected to the one or more end receptacles. The system can be scaled based on the horsepower of the two or more towing vessel.

17 Claims, 4 Drawing Sheets

(56) References Cited

U.S. PATENT DOCUMENTS

| | | | |
|---|---|---|---|
| 3,534,859 A | 10/1970 | Amero et al. | |
| 3,565,254 A | 2/1971 | Latimer | |
| 3,590,584 A | 7/1971 | Fitzgerald et al. | |
| 3,612,280 A * | 10/1971 | Fitzgerald et al. | 210/242.3 |
| 3,653,510 A | 4/1972 | Fitzgerald | |
| 3,662,891 A | 5/1972 | Headrick | |
| 3,666,098 A | 5/1972 | Garland et al. | |
| 3,688,506 A | 9/1972 | Marcocchio | |
| 3,726,406 A | 4/1973 | Damberger | |
| 3,730,346 A | 5/1973 | Prewitt | |
| 3,771,662 A | 11/1973 | Muramatsu et al. | |
| 3,785,496 A | 1/1974 | Smith | |
| 3,815,751 A | 6/1974 | Pavlovic | |
| 3,822,789 A | 7/1974 | Crisafulli | |
| 3,847,816 A | 11/1974 | DePerna | |
| 3,983,034 A * | 9/1976 | Wilson | 210/776 |
| 4,049,554 A | 9/1977 | Ayers | |
| 4,096,700 A | 6/1978 | Muramatsu et al. | |
| 4,116,007 A | 9/1978 | Stagemeyer et al. | |
| 4,116,833 A | 9/1978 | Stagemeyer et al. | |
| 4,133,765 A | 1/1979 | Stupica | |
| 4,136,008 A | 1/1979 | Pogonowski et al. | |
| 4,182,679 A | 1/1980 | Hekle | |
| 4,208,287 A | 6/1980 | Brieck | |
| 4,211,659 A | 7/1980 | Nyfeldt et al. | |
| 4,362,631 A | 12/1982 | Bocard et al. | |
| 4,388,188 A | 6/1983 | Morris | |
| 4,428,319 A | 1/1984 | Henning et al. | |
| 4,554,070 A | 11/1985 | Jordan | |
| 4,610,794 A | 9/1986 | Tsahalis | |
| 5,409,607 A | 4/1995 | Karlberg | |
| 5,614,085 A * | 3/1997 | Platt, III | 210/242.1 |
| 6,073,382 A | 6/2000 | Willener | |
| 6,881,335 B2 | 4/2005 | Nilsen | |
| 7,008,139 B2 | 3/2006 | Nilsen | |
| 2006/0144773 A1* | 7/2006 | Thomazeau | 210/241 |
| 2010/0143038 A1 | 6/2010 | Cobb | |

OTHER PUBLICATIONS

Magie et al. ("Development of a Mobile PIT-Tag Separation by Code and Interrogation Device," p. 120, Oregon Chapter AFS Annual Meeting 2010 Abstracts, Feb. 24-26, 2010).
RO-CLEAN DESMI, Marine and industrial oil spill products and services brochure, 2008.
NORLENSE Active Oil Trawl product brochure, 2010.
NOFI Ocean Buster product brochure, 2010.
THOMSEA Oil Trawl product brochure, 2010.
Hanson et al. ("Oil Spill Response in Fast Current—A Field Guide," U.S. Coast Guard Research & Development Center, report No. CG-D-01-02, Oct. 2001).

* cited by examiner

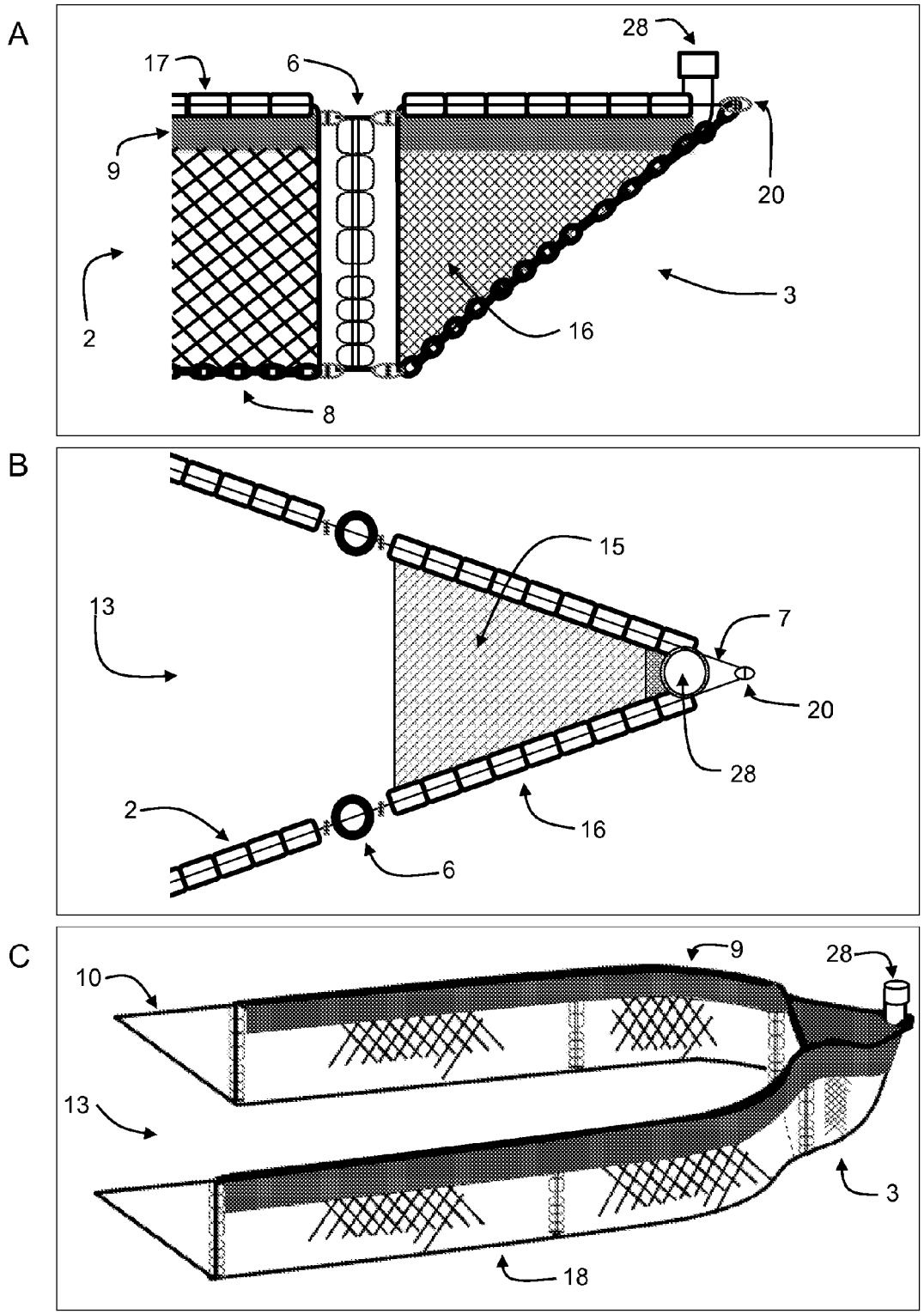

SYSTEMS AND METHODS FOR RECOVERING OIL FROM WATER

CROSS-REFERENCE TO RELATED APPLICATION

This application claims priority benefit of U.S. provisional application Ser. No. 61/354,147, filed Jun. 11, 2010, which application is incorporated herein by reference in its entirety.

INTRODUCTION

1. Field of the Invention

The invention relates generally to products and processes, and more specifically, to systems and method for recovering contaminants, such as oil, from water.

2. Background of the Invention

Oil spilled on the surface of water can cause serious environmental problems to inland and marine environments. Devices that aid in recovery and cleanup are therefore of great importance. Boom systems are one of the more common used to corral and recover slicks. While they can be effective in calm waters, oil spills in fast or turbulent open water such as ocean, river and coastal environments further complicate recovery because oil is more prone to entrain under or splash over the boom and escape recovery.

Different systems have been reported to skim oil as it goes by a recovery device or by slowing or calming the oil down for containment and recovery from a basin. Representative examples include U.S. Pat. No. 3,523,611, U.S. Pat. No. 4,208,287, and U.S. Pat. No. 5,409,607, which disclose towed devices employing sump designs. U.S. Pat. No. 3,565,254 and U.S. Pat. No. 3,847,816 report weir-type skimmers that suck oil through oil boom slits. U.S. Pat. No. 4,096,700 discloses an oil recovery device that guides oil into a calming basin through boom slits. U.S. Pat. No. 4,136,008 and U.S. Pat. No. 4,133,765 disclose towed booms employing gravity pumps. U.S. Pat. No. 4,610,794 reports a dual boom system.

Various towed oil recovery devices have also been reported that employ passive oil scoops or planers designed in theory to slice the oil-water interface and lift the oil from the surface of the water when under tow. Representative examples include U.S. Pat. No. 4,388,188, which discloses a towed system with an oil planing catcher that funnels oil into a barge. U.S. Pat. No. 4,116,833 reports a towed device with an oil scoop. U.S. Pat. No. 6,881,335 discloses a towed oil recovery device with a wedge-shaped oil planer and oil separating basin of continuous hull.

Towed net-type systems have also been reported. Representative examples include U.S. Pat. No. 4,428,319, which discloses a manned sock skimmer suspended and controlled by an outrigger. U.S. Pat. No. 4,211,659 and U.S. Pat. No. 4,362,631 disclose trawls that trap oil in socks.

Numerous other oil recovery products have been developed, such as the NorLense "Active Oil Trawl" (www.norlense.no), which corrals oil into a passive wave pump and trailing storage bladder. The NOFI "Oil Buster" (www.allmaritim.com) guides oil into an oil calming basin. The Thomsea (www.thomsea.com) and the Jackson "ScanTrawl" (www.jacksonboom.co.uk) systems trap oil in trawl socks.

Unfortunately, there is a clear gap in the ability of available systems to effectively recover free floating oil in open waters. Current towed systems, or the use of towed booms as a corralling technique, do not perform well in open water and for large volumes of oil. They are fragile, and if damaged, can be rendered useless. Manned skimmers have limited swath area and capacity. Oil trap socks have limited capacity and efficiency. Also, the above towed oil recovery systems tend to indiscriminately trap marine life in conjunction with oil.

Accordingly, there is a need for improved products and methods for recovering oil and other contaminants from water. The present disclosure addresses these and other needs.

BRIEF SUMMARY OF THE INVENTION

This invention relates generally to products and processes, and more specifically, to systems and method for recovering contaminants, such as oil, from water. The products include a towable net system, as well as kits concerning the same. The processes include various methods of using the towable net system and kits.

The towable net system comprises two vertically floatable wing nets defining a forward channel converging aftward on a tapered collection device, the tapered collection device comprising a mouth with above and below waterline portions positioned in fluid communication with the forward channel for receiving the contaminants, the wing nets each individually having aft end vertical sides opposably adjoining and substantially the same height as the mouth, the mouth defined by a horizontally floatable roof portion, a submersible floor portion, and side wall portions attachably arranged to form an inner channel, the inner channel tapering upward and aftward from the mouth to an aftward opening in fluid communication with the forward channel, the submersible floor portion and side wall portions comprising mesh dimensionally sized to guide the contaminants upward and aftward to the aftward opening while freely permeable to water when under tow, the aftward opening fitted with a connector optionally attached to a pump for removing the contaminants.

In certain embodiments, the connector of the subject towable net system is a metal or other similar material-type connector. In some embodiments, the connector is attached to one or more pumps through one or more hoses, such as a hose connector attached through a hose to a vacuum pump, particularly a two stage vacuum pump. In a related embodiment, the pump is in fluid communication with a receiving container.

In one embodiment, the horizontally floatable roof portion of the subject towable net system includes a cover section of a fluid impermeable material. In some embodiments, the cover section includes or is otherwise attached to freeboard and skirt portions. In one embodiment, peripheral edges of the cover section extend downward about 1 to 4 feet, typically about 2 feet from the top of the headrope, and attach to the side wall portions so as to line the internal and/or external side wall faces of the collection device with contaminant deflection means comprising fluid impermeable material, such as a continuous horizontally disposed vinyl panel. In some embodiments, the freeboard and skirt portions of the cover section adjoin freeboard and skirt portions of the wing nets so as to form continuous above and below water deflection means to aid channeling the lighter than water contaminants from the forward channel to the aftward opening.

In as many embodiments, the mesh of the side wall and submersible floor portions, and optionally the horizontally floatable roof portion of the subject collection device, are constructed essentially of integrated netting material, such as formed by sewing, seaming and/or shackling together of netting material and/or panels, and optionally including one or more framing members for shaping. In one embodiment, the forward end of the horizontally floatable roof is angled upward towards the mouth and above water line, and the aftward end of the horizontally floatable roof is angled downward towards the aftward opening and at or just below waterline. In one embodiment, the horizontally floatable roof portion includes one or more air purge valves or vents.

In another embodiment, the horizontally floatable roof, the submersible floor, and side wall portions of the subject towable net system is pyramid shaped, such as a pyramid shaped net or the like.

In one embodiment, the submersible floor portion of the subject towable net system has an incline grade ranging between 40% and 150%, typically 50% to 100%, and preferably about 75%. In a related embodiment, the submersible floor portion has a set depth at the mouth of at least about 6 to 12 feet, and the horizontally floatable roof portion and/or the inner channel extends aftward at least about 6 to 12 feet. In another related embodiment, the aftward opening of the subject towable net system is at or above waterline, the horizontally floatable roof portion normally in plane with waterline. In yet another related embodiment, the mouth of the subject towable net system includes a spreader bar at a forward edge of the horizontally floatable roof portion.

In some embodiments, the subject towable net system includes one or more excluders for release of marine life, such as at the tapered collection device.

In one embodiment, the towable net system comprises adjustable buoyancy means for raising and lowering one or more components of the towable net system relative to waterline, particularly the tapered collection device, such as pneumatic system, one or more inflatable/deflatable airbags, bladders, and the like.

In certain embodiments, the vertically floatable wing nets of the subject towable net system comprise upper and lower edges, and forward and aft end vertical sides, the upper edge normally in plane with waterline, and the lower edge below waterline. In one aspect, the lower edge is normally in plane with waterline. In another aspect, the upper edge is defined by a head rope, the lower edge defined by a foot rope. In an additional aspect, one or more of the vertical sides is attached to a spar buoy. In one embodiment, the upper edge includes a downwardly depending fluid impermeable skirt extending along the length of the edge. In as many embodiments, the vertically floatable wing nets include or are otherwise attached to fluid impermeable freeboard and skirt portions, which many be integral with or otherwise adjoined to freeboard and skirt portions of the collection device.

In a particular embodiment, the vertically floatable wing nets of the subject towable net system each individually comprise one or more panels. A specific aspect is where one or more the panels of a given wing are attached via a spar buoy disposed therein between. Another specific aspect is where one or more of the panels of a given wing are attached to the collection device via a spar buoy disposed therein between.

In one embodiment, the vertically floatable wing nets of the subject towable net system include a larger mesh than mesh of the collection device. In a specific embodiment, the vertically floatable wing nets have a netting mesh size of 4 inches, and the collection device has a netting mesh of 2 inches.

A specific embodiment is directed to a towable net system of the subject disclosure comprising one or more components according to any one of FIGS. 1, 2, 3, and 4, including embodiments directed to some or all aspects of the subject matter depicted in these figures.

In one embodiment, a kit is provided comprising a towable net system of the subject disclosure, wherein one or more components of the towable net system are optionally packaged therein for rapid assembly and deployment.

In another embodiment, a method is provided for channeling, collecting and removing contaminants, such as oil, from bodies of water, the method comprising deploying a towable net system of the subject disclosure.

BRIEF DESCRIPTION OF THE FIGURES

FIG. 4, panel A is a schematic showing a side view of the aftward end of a collecting device, in accordance with an embodiment of the invention; panel B is a schematic showing a top down view of the aftward end of a collecting device, without a roof cover section so as to reveal the mesh floor, in accordance with an embodiment of the invention; and panel C is a schematic showing a three-dimensional view of a towed net system, in accordance with an embodiment of the invention.

DESCRIPTION OF SPECIFIC EMBODIMENTS

Figure 1:
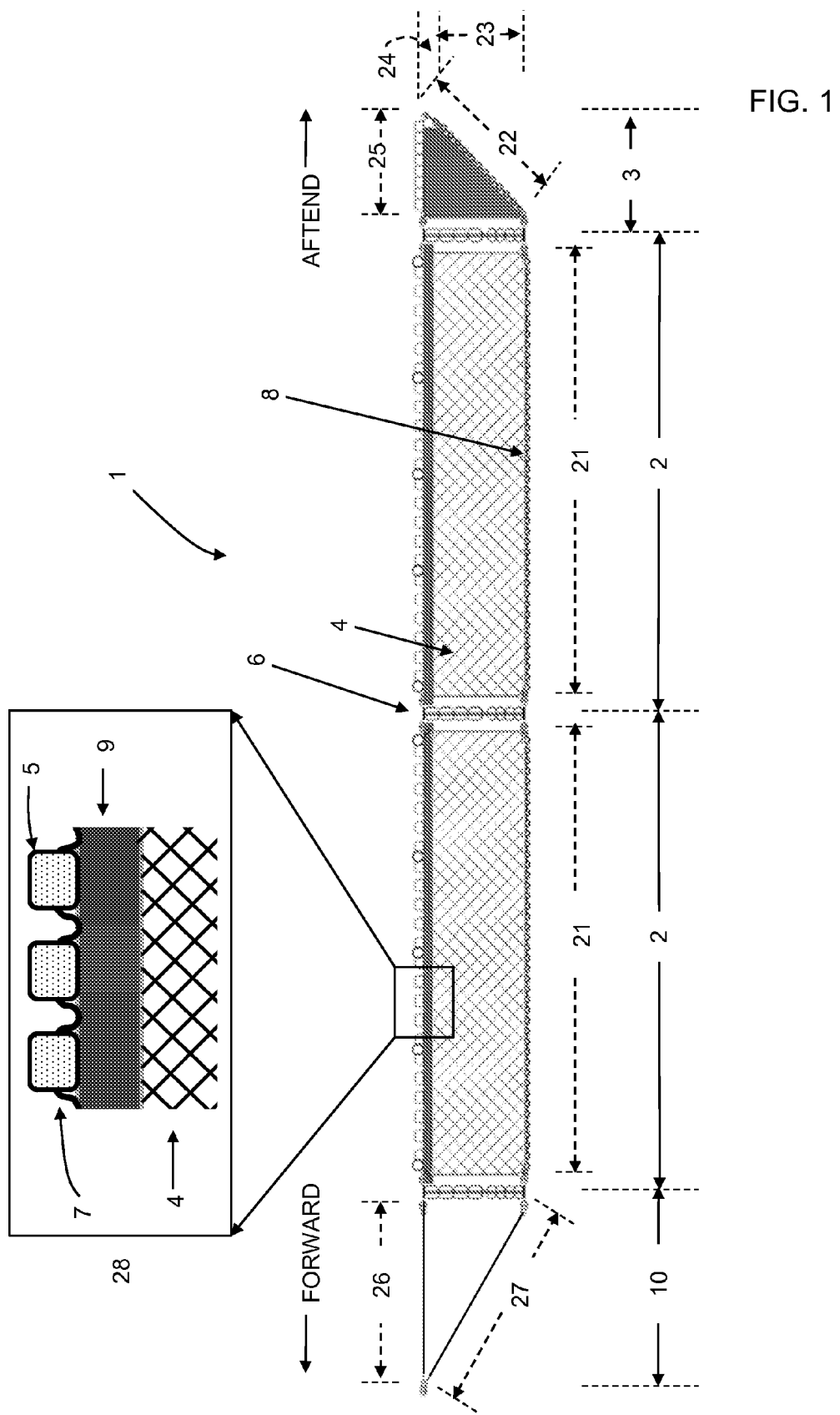
FIG. 1 is a schematic representation of a side view of a net system, in accordance with an embodiment of the invention.

As summarized above, this invention relates generally to products and processes, and more specifically, to systems and method for recovering oil from water. In one embodiment, a towed net system is provided which has the ability to collect free floating oil to one or more end points from which either/both hydrodynamics and/or one or more powered pumps are used to deliver channeled and collected oil to one or more receiving vessels. In some embodiments, two wing nets are provided, either/each towed by one or more vessels, connected to one or more end receptacle nets. From the one or more end receptacles, the channeled and collected oil is delivered to one or more receiving containers also connected to the one or more end receptacles. The system can be scaled based on the horsepower of the two or more towing vessel.

Specific details of certain embodiments of the invention are set forth in the following description and in FIGS. 1-4 to provide a thorough understanding of such embodiments. The present invention may have additional embodiments, may be practiced without one or more of the details described for any particular described embodiment, or may have any detail described for one particular embodiment practiced with any other detail described for another embodiment.

In some embodiments, apparatuses and techniques are provided for channeling, collecting, and removing contaminants, such as oil, from bodies of water. In some embodiments, an effective, scalable, and easily deployable system/device is provided to collect spilled oil from bodies of water before it reaches land. In some embodiments, a system is provided that can collect free floating oil (or other free floating substances) on any body of water, including lakes, rivers and oceans. In some embodiments, two or more vessels tow one or more components disclosed herein.

In some embodiments, a towed net system is provided which has the ability to collect free floating oil to one or more end points from which either/both hydrodynamics and/or one or more powered pumps are used to deliver channeled and collected oil to one or more receiving vessels. In some embodiments, two wing nets are provided, either/each towed by one or more vessels, connected to one or more end receptacle nets. From the one or more end receptacles, the channeled and collected oil is delivered to one or more receiving containers also connected to the one or more end receptacles. The system can be scaled based on the horsepower of a towing vessel.

In some embodiments, one or more vessels tow a "wing" section, which is made up of one or more panels of mesh of certain size and diameter depending on viscosity of the targeted spilled material. The top of each of the one or more panels have one or more floatation devices sewn in, known as head rope. The bottom of each of the one or more panels has weight sewn in, known as foot rope. Each of the one or more panels also have an impermeable material sewn in extending from the head rope down to a set depth. The one or more wings are made up of one or more panel sections connected by being either sewn or hammerlocked or the like.

In some embodiments, the one or more wings incorporate one or more spar buoys at ends of each of the one or more panels which raise the head rope above the surface of the water if required by the type of substance or sea state in which the system is operating.

In some embodiments, each of the one or more wings is towable by one or more vessels of substantially similar size and/or horsepower, with the head ropes floating at the surface and the foot ropes keeping the one or more panels substantially/approximately perpendicular in the water column.

In some embodiments, one or more collection devices, also known as a cod end, is a pyramid shaped net or the like. The front end is four sided, or otherwise shaped, and substantially the same height as the one or more wings. The vertical sides are attached to the one or more wings. The back end is approximately to substantially smaller than the front end, either/both in width and/or height, with the head rope of the back end at the surface. This narrowing creates a venturi effect to push the collected material to the back end of the collection device.

In some embodiments, at the back end includes a metal or other similar material-type connection to which one or more hoses are attached. The one or more hoses are attached to one or more dual stage or the like vacuum pumps that draw the collected material through the one or more hoses.

In some embodiments, the back end includes one or more connections to allow the towing of a receiving vessel. The receiving vessel is where the collected material is pumped to.

In some embodiments, two or more towing vessels pull substantially the entire system of one or more wings, one or more collecting devices, and one or more receiving vessels so that the distance between the one or more wings when underway is approximately to substantially wider than width of the one or more collecting devices. Movement through the water creates a hydrodynamic force that pushes the targeted substance to the mid area between the one or more wings and down to the collecting device. With the mesh used in the one or more wings and the one or more collecting devices, water passes out below each part, and substantially only the targeted substance and water within the layer of the size of the back ends of the one or more collecting devices will be pumped out into the one or more receiving vessels. The size of the one or more wings, the one or more collecting devices, and the one or more vacuum pumps can be scaled up or down, such as depending on the horsepower of the two or more towing vessels and the area in which the system is deployed.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims. In addition, many modifications may be made to adapt a particular situation, material, composition of matter, process, process step or steps, to the objective, spirit and scope of the present invention. All such modifications are intended to be within the scope of the claims made herein.

In this specification and the appended claims, the singular forms "a," "an" and "the" include plural reference unless the context clearly dictates otherwise. Conversely, it is contemplated that the claims may be so-drafted to exclude any optional element. This statement is intended to serve as antecedent basis for use of such exclusive terminology as "solely," "only" and the like in connection with the recitation of claim elements or by use of a "negative" limitation.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Also, it is contemplated that any optional feature of the inventive variations described herein may be set forth and claimed independently, or in combination with any one or more of the features described herein.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

All existing subject matter mentioned herein (e.g., publications, patents, patent applications and hardware) is incorporated by reference herein in its entirety. The referenced items are provided solely for their disclosure prior to the filing date of the present application. Nothing herein is to be construed as an admission that the present invention is not entitled to antedate such material by virtue of prior invention.

In further describing the subject invention, the subject towable net system and methods are described first in greater detail, followed by a detailed description of exemplary embodiments, and then a review of various kits and deployment systems that may find use with the subject net system, as well as a discussion of various representative applications and advantages thereof.

Towable Net System and Methods

As described above, the subject invention provides a towed net system. The towable net system comprises, in operable association, vertically floatable wing nets defining a forward channel converging aftward on a tapered collection device for channeling, collecting and removing contaminants, such as oil, from bodies of water. The towed net system components are described in greater detail below.

Briefly, the vertically floatable wing nets include wing net faces the normally below waterline portion of which are constructed essentially of mesh/netting and that further comprise freeboard and skirt, framing, securing, flotation and ballast means to maintain the wings in a normally vertical and open position for channeling surface water contaminants when under application. The aft end of each wing is attached to the body of the tapered collection device.

The tapered collection device includes a mouth which opens between the wings and extends from below to above the surface or waterline for receiving the contaminants into an inner channel of the device. The inner channel extends from the mouth aftward to an aftward opening for discharging the contaminant flow from the inner channel.

The inner channel of the tapered collection device is defined by a horizontally floatable roof portion, side wall portions, and a submersible floor portion attachably arranged so that the inner channel tapers upwards and aftwards to the aftward opening. The faces of normally below waterline portions of the side wall and submersible floor portion faces are constructed essentially of mesh dimensionally sized to guide contaminated fluid aftward and upwards while being freely permeable to the bulk water in the inner channel when under tow. Other components include framing, securing, flotation and ballast means to maintain the desired positioning of the mouth, inner channel and aftward opening when under application.

The aftward opening of the tapered collection device is fitted with a hose connector for attaching a pump. The pump is employable for removing and discharging the collected materials into a holding tank and/or recovery vessel. The pump is preferably a powered pump, such as a vacuum pump, particularly a two stage vacuum pump.

A further component that is preferably included is an adjustable buoyancy means for raising and lowering one or all portions of the towable net system relative to waterline, particularly the tapered collection device.

Wing Nets

As described above, the below waterline faces of the wings include mesh dimensionally sized to channel the contaminants while being freely permeable to water when under application. Thus the vertically floatable wing nets of the system act as concentrating elements creating hydraulic turbulence along the mesh netting of its sides. The hydraulic turbulence generates an inward force that forms a forward channel converging aftward on the collection device at apex when under application.

The mesh size of the netting is chosen to control parameters such as local hydrodynamic turbulence and contaminant selectivity. In general, the mesh portion of the wing nets is greater, such as between 1-10 times greater, 1-4 times greater, typically 2-3 times greater, and usually about twice that of the mesh portion of the tapered collection device. For example, the wing net mesh is generally around 4 inches, while that of the collection device is about 2 inches. The mesh dimensions of the wing nets and collection device can also vary along the length and/or height of the system, for example, with a tighter mesh at the top and a more porous mesh at the bottom of the collection device, and/or a tighter mesh aftward compared to the forward portions of the wing nets. The net portion can be constructed of various natural, synthetic materials or combinations thereof, such as fiber, plastic, metal and the like. Netting materials in the fishing industry are well known and can be readily applicable for this purpose. Polypropylene and nylon netting are of specific interest.

The vertically floatable net wings have a set depth sufficient to stabilize the towed net system when under application. The set depth of the wing nets, i.e., depth of the deepest lower edge of a wing net from waterline, is chosen to control parameters such as the overall dimensions and hydrodynamics of the water column and forward channel. The set depth of the wing nets is generally at least about 5-20 feet, usually about 6-12 feet, and more typically about 12 feet. This aspect not only reduces the potential for entrainment of contaminants, but it also maximizes the benefits of the stabilizing water column and channel formed thereby when deployed. The wing nets can also be vertically tapered or remain essentially the same height from the aftward collection device to a forward end spar buoy or bridle. As such, the set depth of the wing nets determines the height of the water column in the forward channel, and contributes significantly to the shape, stability and recovery rate of the net system under application.

An important feature is that the aftward end vertical sides of the wing nets adjacent the mouth of the collection device, and the normally vertical sides of the mouth itself have essentially the same set depth, the set depth being sufficient to stabilize the net system and maximize contaminant recovery and when under tow. The vertical sides of the wing nets can extend above and/or below the mouth in certain embodiments, provided the normally vertical sides of the mouth and wing nets are substantially the same height.

The mesh dimensions and set depth of the forward and aftward ends of the vertically floatable wing nets can thus be adjusted each independently to optimize the contaminant recovery rate for a given end use.

The vertically floatable wing nets generally include freeboard and skirt, mesh, ballast, framing and connection portions. The mesh portion is discussed above. The freeboard (or above waterline portion) includes a downwardly depending skirt or top line cover section or panel portion preferably constructed of material impermeable to the contaminants and water, such as a vinyl panel. The freeboard and skirt extend lengthwise along the top of the wings from at least the mouth to a suitable forward position for a given end use. The freeboard and skirt provide above and below waterline deflection means impermeable to fluid. The height of the freeboard and skirt are generally about 1 to 4 feet, usually about 2 to 3 feet, and typically 2 feet, may taper in proportion to the wing nets as needed. The aftward end of the wing net freeboard and skirt portions are generally integral with and the same height as freeboard and skirt portions of the collection device at seam line.

The freeboard and skirt, and remaining portions of the vertically floatable wing nets generally include floatation and ballast means to provide the desired directional buoyancy, such as one or more floats and weights. Examples of floats include foam or plastic floats, hollow metal floats, inflatable floats or airbags, and the like. The floats can be provided in continuous or interrupted strings, as well as individually positioned in various combinations. Examples of specific interest include headrope. Spar buoys may also be provided alone or in combination to orient the wing nets in a normally vertical manner to waterline as desired. The ballast portion is provided to submerse the sides of the wing nets and maintain the desired plane and set depth in relation to waterline. Examples of ballast include footrope such as chain, leadline and the like. The floatation and ballast means can thus be continuous, spaced in intervals, or combinations thereof, and adjustable.

The framing and connection portions are exemplified by steel and carbon fiber tubing, Kevlar or steel rope, shackles and the like.

As also described above, the vertically floatable wing nets can be modular in construction, in the form of one or more panels.

The vertically floatable wing nets of the subject system are thus designed for operation under various open water and even turbulent conditions to channel and concentrate surface contaminants such as oil upward and toward the collection device when under tow and/or anchored in a stationary position normally perpendicular to a surface current.

Collection Device

As described above, tapered collection device includes a mouth connected through an inner channel to an aftward opening fitted with a connector for attaching a pump. The inner channel is defined by a horizontally floatable roof portion attached to a submersible floor portion through downwardly extending side wall portions. The mouth includes above and below waterline portions positioned for receiving the contaminants. The aftward opening is positioned at or above waterline for discharging the contaminants.

The mouth of the collection device has a larger opening than the rear or aftward opening discharge end, making the inner channel connecting the two increasingly narrow aftward to create a hydrodynamic flow venturi effect. The inner channel also tapers upward from the mouth and aftward to the aftward opening. The collection device thus controls the rate of flow, speed, direction, mass, and shape of the fluid stream that emerges from it.

Thus the tapered collection device can be in the shape of a pyramid, cone or other various similar geometric configurations that varies in cross sectional area of the inner channel so as to narrow and direct the flow of contaminated fluid from the receiving end mouth upward to the aftward opening discharge end. This includes an inner channel that is more or less pyramidally-tapered upward to more or less conically-tapered upward.

The horizontally floatable roof, side walls and submersible floor portions of the collection device are attachably arranged to delineate the shape. In particular, peripheral edges of the roof portion are adjoined to the side walls by any number of suitable means, such as by welding, sewing, knotting, seaming, latching, hitching, securing to a framing spar and the like, or otherwise simply as an extension of a continuous integrated or interconnected panel of mesh that forms the desired shape with the assistance of one or more framing members such as spars, ropes, floats, and/or ballast means when under application. Similarly, the downwardly extending side walls adjoin, terminate in or otherwise form in a continuous integrated manner the submersible floor portion. However assembled, the roof, floor and side portions are arranged to form an essentially continuous and upwardly tapered inner channel through which the contaminants are received, channeled, and discharged in a continuous flow and unhindered manner.

In addition, the submersible floor portion includes mesh dimensionally sized and at an incline grade sufficient to channel the contaminants upward and to the aftward opening while allowing bulk water in the inner channel to freely pass below the aftward opening when under tow. Specifically, the incline grade of the floor of the inner channel is relatively steep, for example, ranging from between 40% and 150%, typically 50% to 100%, usually about 75% (i.e., 70%-80%), and is determined by the slope of the floor. Because the floor and side walls of the tapered collection device include embodiments in which they are constructed essentially of mesh with or without framing, the side walls and submersible floor portion can be rigidly shaped, curved or otherwise deformable in a concave or slightly bulging manner. The incline grade is therefore based on a floor slope calculated from the set depth at the floor of the mouth to the upper end of the floor when under application. The fluid force hitting the upwardly inclined and tapered mesh floor bounded by side walls and roof generates sufficient head pressure to lift lighter than water contaminants upward while allowing bulk water to pass through the floor and other mesh portions of the collection device. These and other aspects along with the attached pump system permits a surprisingly high contaminant to water recovery ratio, including a 80%-90% or greater, up to effectively 100% recovery.

The horizontally floatable roof portion of the tapered collection device can be constructed of various materials. It is preferably constructed of a material impermeable to fluids in general, such as an fluid impermeable and flexible panel or cover section, e.g., a vinyl cover. The roof portion may include a downwardly depending skirt portion attached to and/or overlapping or underlapping with the downwardly depending side wall portions of the collection device. This aspect permits the roof to act as a deflection panel capable of applying a downward and inward containment force on the contaminant fluid as it flows through the inner channel and upward to the aftward opening. The roof can be shaped such as with one or more faming spars so as to form substantially flat, gabled, arched, dome, or other structures suitable for accommodating and containing the contaminants in the above waterline portion of the collection device. Buoyancy of the roof may be provided by any suitable floatation means, such as opposing spar buoys at the mouth and/or a head rope circumscribing part of or all of its horizontal periphery. The roof may also include one or more air purge valves or vents for releasing and minimizing air pockets or bubbles that may otherwise form in the inner channel when under tow. The air purge valves or vents are selected and positioned so as to avoid escape of contaminants, while allowing the release of air. For example, a check valve can be useful for this purpose.

The net portions of the collection device can be constructed of various natural, synthetic materials or combinations thereof, such as fiber, plastic, metal and the like. Netting materials in the fishing industry are well known and can be readily applicable for this purpose. Nylon netting is of specific interest.

Another important feature of the tapered collection device is the ability to directly attach a pumping system to maximize the benefits of the continuous flow aspect of the subject towable net system. In this regard the aftward opening of the tapered collection device is fitted with a hose connector for attaching one or more pumps thereto through one or more hoses. The hose connector can be a flange or any other adaptor suitable for securely and sealably attaching a hose to the collection device, and may include male and female adaptor configurations with or without extenders, joints and the like. The hose connector is preferably a vacuum flange that is reversibly attachable to a hose member by bolting, snap locking, clamping or the like. The aftward opening, the hose connector, or both are generally positioned at or above waterline, and can vary in angle, shape and extension relative to the waterline, such as extending aftward in a normally horizontal manner, extending upward in a normally vertical manner through the horizontally floatable roof portion, and/or angles therein between. This includes positioning of the aftward opening directly or indirectly upward through the top of the horizontally floatable roof portion, and through the cover section.

The collection device may also include securing apparatus at the aft end for various applications, such as mooring, rigging, or attaching a trailing support vessel or barge. For example, a trailing vessel is advantageously employed to house the pump system and contaminant collection tanks, and can be attached to the collection device securing means and towed alongside, behind, or in other suitable formation.

While the attack angle of the sides of the mouth can vary relative to the water column of the forward channel, it is preferable that the normally vertical plane of the mouth opening be positioned perpendicular to the fore-aft axis of the forward and inner channels when under tow. Thus in some embodiments, the submersible floor portion may extend beyond and forward relative to the floor at the mouth, forming an extended forward submersible floor portion that extends into the forward channel. Similarly, in other embodiments the submersible floor portion may recess towards the aftward opening relative to the forward edge of the horizontally floatable roof portion.

The vertically floatable wing nets and/or the tapered collection device may further include manual and/or automatic adjustable buoyancy means to raise and lower some or all parts of the system collectively and/or separately. The adjustable buoyancy means includes hoisting by hand or mechanically, pneumatic systems, adjustable airbags, bladders and the like. The adjustable buoyancy means can thus be controlled passively, actively, directly and/or remotely. Preferably, the adjustable buoyancy means are remotely controlled airbags, and are attached to or integral with at least one or more portions of the collection device. For example, one or more pneumatically controlled airbags suitably positioned on the collection device can be adjusted to raise and lower the collection device in the water by filling the floats attached to the codend with more or less air depending on the speed of the vessel and the type of product being collected. The adjustable buoyancy means thus acts like a manual oil/water separator and allows the water to pass through the net below the aftward opening discharge end. If the slick is coagulated and thick then air can be released to lower the collection device and collect the heavier material.

The collection device may also include one or more excluders. The inclusion of "excluders," such as those used in fish nets, provide an escape path for specific species such as turtles.

Pump

As described above, the collection device in as many embodiments is directly attached through the aftward opening connector to a pump through a hose, which can include one or more pumps attached through one or more hoses. Of particular interest is a powered pump. In the absence of a powered pumping system that continuously removes the contaminants at the codend, the discharged contaminants may remix with water and limit the recovery rate. While discharge of fluids without a pump attached may be desirable under certain situations, in the presence of the powered pumping system the venturi effect afforded by the tapered collection device can be significantly exploited by creating a positive discharge pressure at the aft end well beyond that created by the tow or current rate. Thus the powered pumping system in combination with the tapered collection device design is an important feature to maintain an appropriate continuous flow distribution in the collection device for a wide range of deployment scenarios, thereby significantly improving contaminant recovery rates.

The powered pump includes a main pump and power pack and optionally, holding and/or receiving tank. A specific powered pump of interest is a two stage vacuum pump. The two stage design allows for continuous pumping with the ability to actually pull oil from the collection device into a collection vessel, unlike current systems. There are no impellors or valves to be clogged or damaged by debris.

A pump system of specific interest is a dual stage vacuum pump driven by diesel engines. This pump includes two main pieces. The first component is a power pack that includes one or more diesel engines and liquid ring seal pumps, vacuum and pressure manifold, computer, touch screen or other control panel, and fuel tank. The second component is a tank skid which includes aluminum, steel or similar pump tank secured to the skid. The skid connects to the power pack with two hoses, one for vacuum and one for pressure, and two suction and discharge flanges for connecting the collection device hose. The tank skid should be deployed towards the stern of the vessel. The power pack can be deployed anywhere safety and convenience dictates, usually within 75 feet of the tank skid.

Of specific interest is a two stage vacuum pump with 10 inch inlet obtainable from Environmental Technologies, Inc. (http://www.transvac.com/countervac.htm). Such a pump has a pumping capacity of 3,500 gallons per minute and allows the system to actively and continuously recover collected oil under a wide range of deployment scenarios. The oil recovery rate ("ORR") for this pump is calculated to be 3,160 gallons per minute ("GPM") when moving at 1 knot. The ORR at 1.11 knots is as much as 3,500 GPM. The Oil Recovery Efficiency ("ORE") is estimated to be 90.3% at 1 knot and possibly close to 100% at 1.11 knot. As such, the subject towable net system with is readily able to recover at least 2,500 GPM or approximately 35,714 barrels of oil per day in a 10-hour period at a high recovery efficiency rate from a spill of 1-inch thickness. As can be appreciated, a larger two stage vacuum pump with a 24 inch inlet can accommodate even more capacity.

Methods of Deployment

The subject towable net system is extremely flexible and can be deployed in any number of different active or passive configurations. The system can be rapidly adapted to fit the specific contaminant recovery needs and conditions. Such modification and deployment can easily be performed in a short period of time.

By way of illustration, an active deployment configuration using one or more vessels or gantries can be carried out as follows. The wings are attached to tow points on a main gantry, and the pump system placed on an auxiliary gantry. The in-water components are light and can be lifted either by hand or by crane, and pulled into position by hand.

The pump is then connected to the collection end of the collection device through the fitted hose connector via a hose. Once connected, the system can be primed by pumping water through the system. After the priming run, the gantry's can be run backwards to their starting position with everything still connected. The robust design of the net will allow for such movement.

While under operation the collection device is monitored and adjustments made to raise and lower the collection device in the water, such as by filling airbag floats attached to the collection device with more or less air depending on the speed of the vessel and the type of product being collected. As noted above, this acts like a manual oil/water separator and allows the water to pass through the net below the aftward opening/discharge end of the collection device. If the slick is coagulated and thick then air can be released to collect the heavier material. The pumping system can also be turned on and off as needed during collection.

In one embodiment, the towed net system is sweep across a polluted area by skimming the slick using a U-, V-, or J-wing net configuration in which the wing net rig is towed by one or more vessels such that the shape of the netting is U-, V- or J-shaped when under tow depending on rigging, tow speed, wind direction, current, contaminant concentration, viscosity and the like.

More than one net rig can be configured or adjoined in a double or multi-rig configuration, e.g., double-rig configurations such as UU, VV, or JJ. The multi-collection device net system has an advantage for pair and single towed net system boats in that the swept area can be significantly increased.

This allows them to tow one net system but with the efficiency of twin or greater rigging. While achieving a bigger mouth opening with a multi-collection device system, an added benefit is that if one collection device is damaged or in need of maintenance, the other(s) remains intact. Fishing vessels are particularly well suited for and acquainted with working in formation, and thus for deployment of the subject towed net system.

As such, one or more tow vessels can be each independently tethered to opposing wing nets of the system, and a pump is deployed on a collection barge or vessel attached to and trailing the codend. In another example, the system can be towed in active deployment by an Offshore Support Vessel ("OSV") and a smaller tow vessel, using the OSV's tanks to collect recovered oil. In this example, one wing is tethered to the OSV and the other wing to a smaller tow vessel. In an additional example, one or both of the wings can be held open with use of a foil, i.e., a hydrofoil in the context of water. This configuration also permits use of a single tow and collection vessel to achieve various configurations.

Once the vessel or tanks are full of skimmed product or otherwise at a stage for halting operations, the material can be stored or off loaded. When skimming is completed, the net system can be lifted out of the water and collapsed down like an accordion and subjected to decontamination following standard protocols.

Examples of passive configurations include, but are not limited to, an anchored system deployed in a channel in which the wings are anchored to opposing banks of the channel. The tapered collection device is operably connected to the pump and collection tank. The pump and/or collection tank can be deployed on a barge or vessel in the channel, on the channel banks, or a combination thereof. The anchored system is oriented such that the fluid flow is directed toward the collection device.

Thus the terms "under tow" or "under application" as used throughout the disclosure is intended to mean a tow force that includes both active and passive deployment configurations of the subject towable net system unless the context clearly dictates otherwise.

Exemplary Towable Net System

As detailed below and in FIGS. 1-4, an exemplary towable net system for oil recovery consists of in-water components built to a 12 foot depth and a 24 inch aftward opening, discharge end. The design of the net system has a number of advantages. It is made up of interchangeable components, being an upwardly tapered collection device component built to 11 feet 6 inches long, and two vertically floatable wing nets each composed of two deflection panels. Each deflection panel is at least 50 feet long and spaced with a spar buoy. The bridle is built to 20 feet in length in plane with waterline. Each net component in and of itself is easily replaced if damaged, and is relatively inexpensive and easy to produce. The size of the forward net opening and can be easily expanded by adding additional panels. However, the use of netting permits significant flexibility for a given end use, for example, allowing the in-water components to be reduced to a 6 ft depth. In addition, the aftward opening can be scaled for attaching smaller volume pumping systems, such as when fitted with a 10-24 inch hose connector.

Referring to the drawings in detail, wherein like numbers designate like parts, several features of an exemplary towable net system are illustrated. Although the exemplary towable net systems are particularly useful for collection of contaminants from the surface of water when towed by one or more vessels, it will be appreciated that the design of the exemplified embodiments are applicable to other systems and methods described herein and are not intended to be limiting.

Referring initially to FIG. 1, a side view of the towable net system 1 is depicted. The exemplary towable net system employs vertically floatable wing nets each composed of two deflection panel wings 2 to channel oil, a pyramid-shaped net collection device 3 to collect the oil, and a two stage vacuum pump to acquire collected oil from the collection device to a holding tank (not shown).

Figure 2:
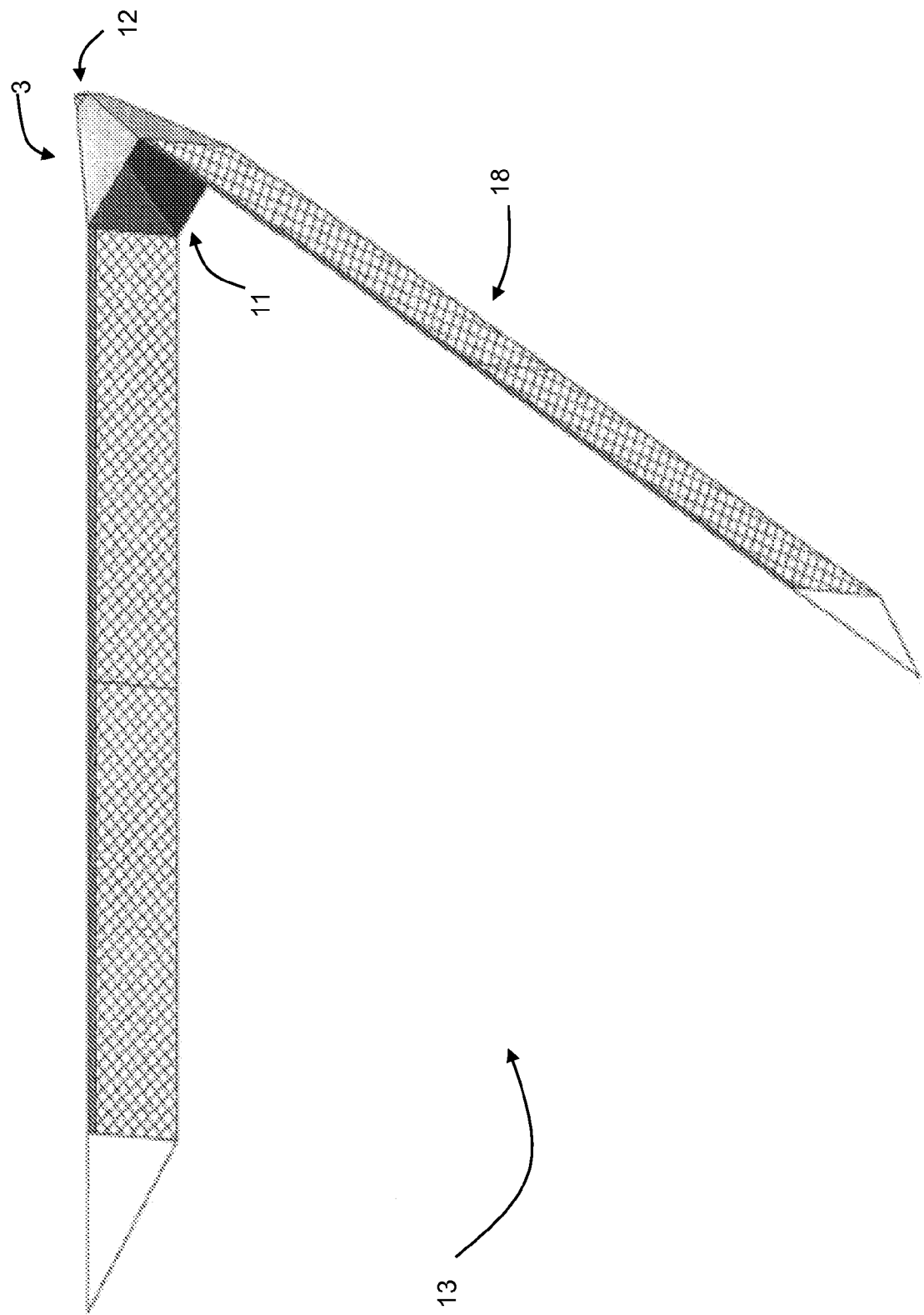
FIG. 2 is a three-dimensional view showing wings and a collection device, in accordance with an embodiment of the invention.

In FIGS. 1 and 2, the wing nets 18, deflection panels 2 and tapered collection device 3 are clearly seen. The figures show the shaped opening on the collection device end, and can be adjusted or created with one or more framing members, such as a stainless top spar. Also note the aftward opening 12, which can be configured for a given end use, such as with a vacuum flange hose connector or the like. Hoses to a vacuum pump can be readily attached to this component. The collection device end can be adjusted via air pumps and airbags to lift or lower the outlet.

The use of high tensile rope 7 and bridles 10 ensures the strength of the components under tow. The use of netting allows the escapement of non-oily water beneath the surface. This also allows the use of built-in excluders for escapement of sea life, such as turtles. A dynamic vortex is created at the codend by the system while under tow. The dynamic vortex directs flow to the pump.

Referring to FIG. 2, the vertically floatable wing nets 18 define a forward channel 13 converging aftward on a tapered collection device 3 for channeling, collecting and removing contaminants, such as oil, from bodies of water. The tapered collection device includes a mouth 11 with above and below waterline portions positioned for receiving the contaminants and an aftward opening 12 for discharging the contaminants.

Figure 3:
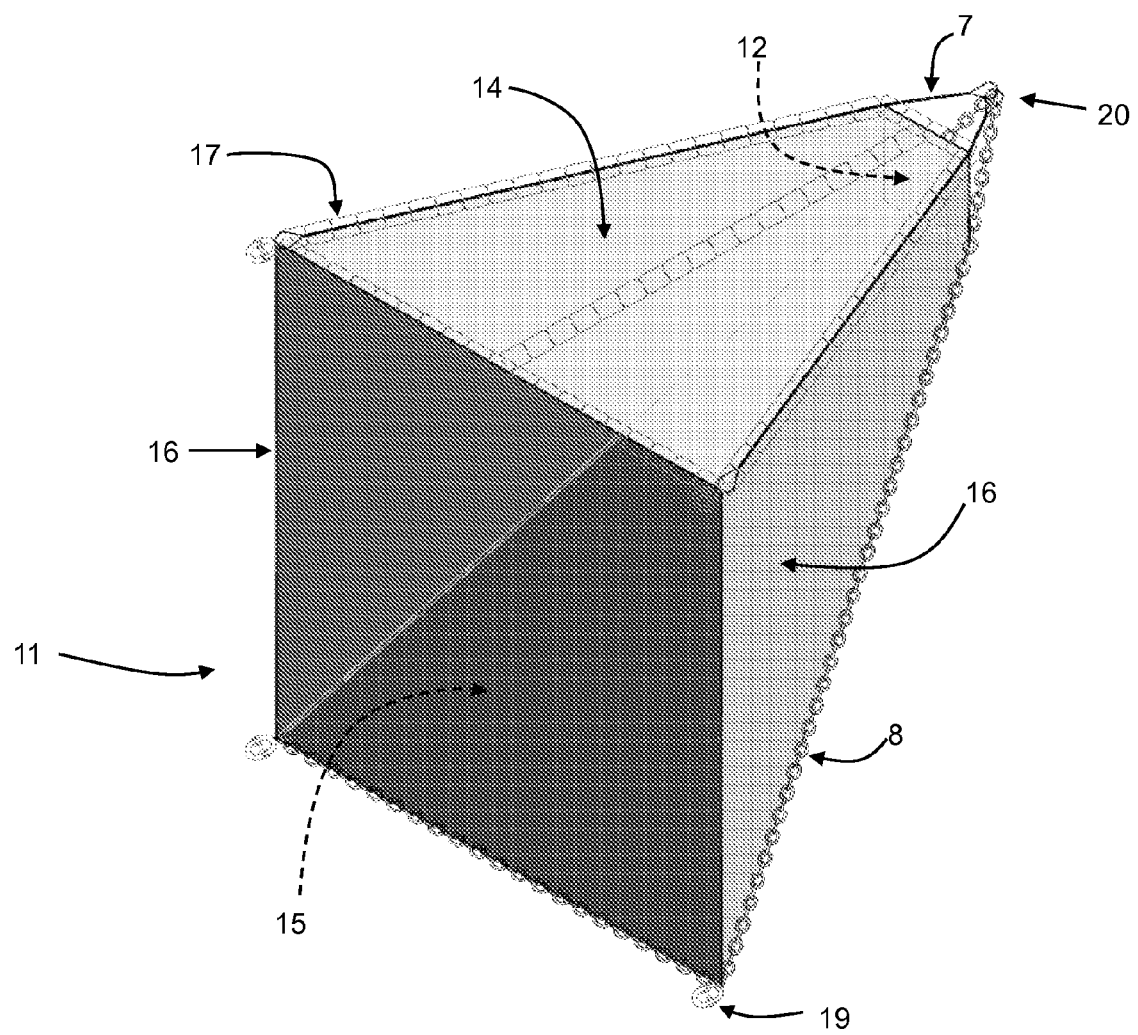
FIG. 3 is a schematic showing a three-dimensional view of a collecting device, in accordance with an embodiment of the invention.

In FIG. 3, the mouth 11 and aftward opening 12 are in fluid communication with the forward channel 13. The mouth is defined by a horizontally floatable roof portion 14, side walls 16, and a submersible floor portion 15. Peripheral edges of the horizontally floatable roof portion 14 adjoined at head rope 17 to opposing side walls 16. As illustrated, the downwardly extending side walls 16 are attached to the submersible floor portion 15 at foot rope 8. The roof, side walls and floor of the collection device define inner channel, which tapers upwards from mouth 11 and aftwards to aftward opening 12. The incline grade of the submersible floor 15 portion as depicted is at 75% grade.

As illustrated in FIGS. 3 and 4, the aftward opening 12 is fitted with a hose connector 28 for attaching a pump thereto through a hose (not shown). The downwardly extending side walls 16 and submersible floor 15 portions are constructed essentially of mesh as illustrated in FIG. 4. Aft end hammerlock 20 provides for attachment to a trailing support vessel or barge (not shown).

Referring to FIG. 4, panel C, a particular embodiment of a towed net system is illustrated in three dimensions and with slight curvature, in which top end continuous fluid impermeable vinyl panel 9 forms freeboard and skirt portions adjoining the cover section of the horizontally floatable roof portion that also cover and extend in a continuous manner around the top horizontal periphery of the collection device and wing nets. The top end continuous fluid impermeable vinyl panel 9 as illustrated is approximately 2 feet high, the skirt portion corresponding to the below waterline portion. Also note the forward channel 13, relatively compact codend 3 and extended hose connector 28.

In one particular embodiment, an apparatus is made up of materials including mesh, rope, chain, floats, and connectors. The apparatus is composed of two wings 18, a collecting device 3, and certain connectors to allow oil to be pumped to a receiving vessel towed from the rear of the collecting device. The two wings 18 are made up of equally constructed 50 ft panels 2 (FIG. 1). The panels are made up of a top line 7 constructed of ¼ inch Amsteel, a foot rope 8 made up of ½ inch chain, EF-30 floats 5 along the top rope, and a 4 inch mesh 4 on the panel 2 section. There is an 18 inch deep impermeable vinyl panel 9 sewn below the head rope. Spar buoys 6 are incorporated into the end sections. Attached to the front of the wing is a bridle system 10 of ¼ inch Amsteel. The wings are pulled into a rigid shape, with some curvature, by the force of the towing vessels, and the drag of the receiving vessel. The wing length can vary depending on the number of panels used. Attached to the end of the wings is a collection device 3 (FIGS. 1 and 3), also known as the cod end. The collection device 3 is a pyramid shaped net made of 2 inch mesh. The front end 11 will be four sided and the same height as the wings 2. The vertical sides 16 will be attached to the wings 2. The aft end will be smaller than the front end, both in width and height, with the top rope 7 of the aft end at the surface, thus creating a four sided cone narrowing to a 24 inch rear opening 12 to which a 24 inch collection hose (not shown) is attached. This narrowing creates a venturi effect to push the collected material to the back end of the codend and into the hose. A continuous vacuum pump (not shown) further assists in drawing the collected oil up the hose and into the receiving vessel (not shown). At the rear of the collecting device is apparatus 20 to which the receiving vessel is connected.

The following reference numerals refer to specific illustrative material and/or dimensional aspects depicted in FIG. 1: reference numeral 3 (CODEND, MESH, 51 millimeter (2 inch) #72 NYLON); reference numeral 4 (MESH, GORE ROPE, 16 millimeter (⅝ inch) POLYPRO); reference numeral 5 (FLOATS, EF FLOATS, 45 pieces per 50 foot section, attached with 16 millimeter (⅝ inch) POLYPRO); reference numeral 6 (SPAR, with EF-70 FLOATS, and weights); reference numeral 7 (TOP LINE, 30 millimeter (1¼ inch) AMSTEEL with DANISH THIMBLE, attached with 10 millimeter (3⅜ inch×3½ inch) SS RING×5 per section); reference numeral 9 (FOOTROPE, 13 millimeter (½ inch) CAMPBELL G80-LL chain, attached with 13 millimeter (½ inch) coupling); reference numeral 10 (BRIDLES, 30 millimeter (1¼ inch) AMSTEEL); reference numeral 21 (WING, 100 millimeters (4 inches), 4.0 millimeter TITAL PE); reference numeral 22 (16 feet and 9 inches); reference numeral 23 (10 feet); reference numeral 24 (2 feet); reference numeral 25 (11 feet and 8 inches); reference numeral 26 (20 feet); reference numeral 27 (23 feet and 4 inches).

Kits & Deployment Systems

Also provided are kits and deployment systems comprising a towable net system of the invention that finds use in practicing the subject methods, as described above. For example, kits and deployment systems that include a towable net system for practicing the subject methods may comprise one or more components thereof, such as one or more of the vertically floatable wing nets, tapered collection device, hose and pump. The kits may also include a towable net system that is pre-assembled and ready-to-use, pre-packaged in a container with one or more components, or provided separately for assembly and application.

Because the minimal components of the subject towable net system are compact, light weight and modular, the system is readily housed and transported on a trailer or via one or more standard transport containers routinely used in daily commerce. For example, the above exemplified towable net system can be housed on a truck trailer, flatbed, or in a shipping container, such as a 20 foot shipping container. The kits may thus include a container housing the components.

In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Yet another means would be a computer readable medium, e.g., a diskette, a CD, etc., on which the information has been recorded. Yet another means that may be present is a website address which may be used via the internet to access the information at a remote site. Any convenient means may be present in the kits.

The term "deployable system" as employed herein refers to a collection of components of a towable net system of the invention, particularly the vertically floatable wing nets, tapered collection device, and pump present in a single or disparate arrangement, that are brought together for the purpose of practicing the subject methods. For example, separately obtained vertically floatable wing nets, tapered collection device, hose and pump brought together to channel, collect, and recover contaminants from the surface of water, according to the present invention, are a deployable system according to the present invention.

UTILITY AND ADVANTAGES

The subject towable net systems, kits and methods and find use in different applications, including removing contaminants from water. The subject disclosure has broad applicability for channeling, collecting, and removing contaminants, particularly floatable surface contaminants from rivers, bays, open ocean and the like. This includes when deployed in conjunction with one or more vessels, as well as in anchored settings when under a tow force imparted by a vessel, current or both.

The subject towable net systems, kits and methods have several advantages. The attendant benefits are particularly apparent for removal of oil from the surface of water.

The in-water components of the subject towable net system are extremely strong and robust, and capable of being towed or otherwise applied under extreme load. The components are also reusable or disposable, with the various pieces of in-water components being easily and economically repaired and replaced when damaged. For re-use, decontamination can be accomplished using current methods approved by various regulatory agencies.

The subject towable net system is also adaptable to various pumping systems that are powerful, efficient, and built to move large volumes of both liquids and solids without being subject to repeated clogging when dealing with ocean flotsam and jetsam. The pump system can also run continuously. In a large scale contaminant spill, this means that the primary limiting factor for recovery is the size of the collection tanks that the recovered product is discharged into.

The subject towed net system therefore offers continuous flow and recovery of surface contaminants when deployed and under application, without buildup and aggregation of the contaminant at the collection device. The in-water components of the system are also advantageously composed mainly of mesh/netting dimensionally sized that directs collection of contaminants while permitting various marine life to escape, and can be readily stored and transported for rapid deployment. The set depth of the system also affords significant stability, high tow rates and maneuverability when under tow, even under turbulent open water conditions, and high oil to water recovery ratios.

As such, the subject invention finds use in a variety of different applications and represents a significant contribution to the art.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

While preferred and alternate embodiments of the invention have been illustrated and described, as noted above, many changes can be made without departing from the spirit and scope of the appended claims. Accordingly, the scope of the invention is not limited by the disclosure of these preferred and alternate embodiments.

What is claimed is:

1. A towable net system for channeling, collecting and removing contaminants, such as oil, from bodies of water, the towable net system comprising:
    vertically floatable wing nets defining a forward channel converging aftward on a tapered collection device;
    the tapered collection device comprising a mouth with above and below waterline portions positioned in fluid communication with the forward channel for receiving the contaminants;
    the vertically floatable wing nets each individually having aft end vertical sides opposably adjoining and substantially the same height as the mouth;
    the mouth defined by a horizontally floatable roof portion, a submersible floor portion, and side wall portions attachably arranged to form an inner channel;
    the inner channel tapering upward and aftward from the mouth to an aftward opening in fluid communication with the forward channel, the submersible floor portion of the inner channel having an incline grade ranging between 40% and 150%;
    the submersible floor portion and side wall portions comprising mesh dimensionally sized to guide the contaminants upward and aftward to the aftward opening while being freely permeable to water when under tow;
    the aftward opening fitted with a connector optionally attached to a pump for removing the contaminants.

2. The towable net system of claim 1, wherein the connector is a metal or other similar material-type connector.

3. The towable net system of claim 2, wherein the connector is attached to one or more pumps through one or more hoses.

4. The towable net system of claim 3, wherein the pump is a vacuum pump.

5. The towable net system of claim 4, wherein the pump is in fluid communication with a receiving container.

6. The towable net system of claim 1, wherein the horizontally floatable roof portion includes a cover section of a fluid impermeable material.

7. The towable net system of claim 1, wherein the tapered collection device is pyramid shaped.

8. The towable net system of claim 1, wherein the tapered collection device comprises one or more framing members.

9. The towable net system of claim 1, wherein the submersible floor portion has an incline grade of about 75%.

10. The towable net system of claim 1, wherein the aftward opening is at or above waterline.

11. The towable net system of claim 1, wherein one or more of the vertically floatable wing nets and the tapered collection device includes adjustable buoyancy means.

12. The towable net system of claim 1, wherein the horizontally floatable roof portion includes one or more air purge valves or vents.

13. The towable net system of claim 1, wherein the vertically floatable wing nets each individually comprise one or more panels.

14. The towable net system of claim 1, wherein the vertically floatable wing nets have a set depth at the mouth of at least 6-12 feet.

15. The towable net system of claim 1, wherein the vertically floatable wing nets include a larger mesh than the tapered collection device.

16. A kit comprising a towable net system according to claim 1, wherein one or more components of the towable net system are optionally packaged therein for rapid assembly and deployment.

17. A method of channeling, collecting and removing contaminants, such as oil, from bodies of water, the method comprising deploying a towable net system according to claim 1.

* * * * *